United States Patent [19]

Henderson et al.

[11] Patent Number: 5,234,479
[45] Date of Patent: Aug. 10, 1993

[54] COMPRESSED NATURAL GAS DRYER SYSTEM AND METHOD OF OPERATION

[76] Inventors: Terry D. Henderson, 1100 Queens Ct., Naperville, Ill. 60563; Charles A. Henderson, 1415 S. Gables Blvd., Wheaton, Ill. 60187

[21] Appl. No.: 908,305
[22] Filed: Jul. 2, 1992
[51] Int. Cl.$^5$ ............................................. B01D 53/04
[52] U.S. Cl. .................................... 95/105; 96/122; 95/122
[58] Field of Search ............... 55/33, 59, 161–163, 55/180; 62/18

[56] References Cited

U.S. PATENT DOCUMENTS

| | | | |
|---|---|---|---|
| 2,224,227 | 12/1940 | Keith et al. | 55/23 |
| 3,225,516 | 12/1965 | Smith et al. | 55/25 |
| 3,950,154 | 4/1976 | Henderson et al. | 55/179 |

*Primary Examiner*—Tim Miles
*Attorney, Agent, or Firm*—Trexler, Bushenll, Giangiorgi & Blackstone, Ltd.

[57] ABSTRACT

A system for compressing and drying a gas from a gas source comprises a compressor operatively connected to the source for compressing the gas. A regenerative dryer for collecting water from the gas is operatively connected to the compressor such that the compressor is within a path of gas flow between the source and the dryer. The dryer is also operatively connected to the source such that water collected from the gas and removed from the dryer does not enter the compressor. A method of compressing and drying a gas is also provided comprising the steps of: supplying a compressor with gas from a source; compressing the gas; collecting water from the gas with a regenerative dryer; regenerating the dryer by removing collected water from said dryer with a purge gas; and delivering the purge gas to the source such that no purge gas or collected water is supplied to the compressor.

16 Claims, 2 Drawing Sheets

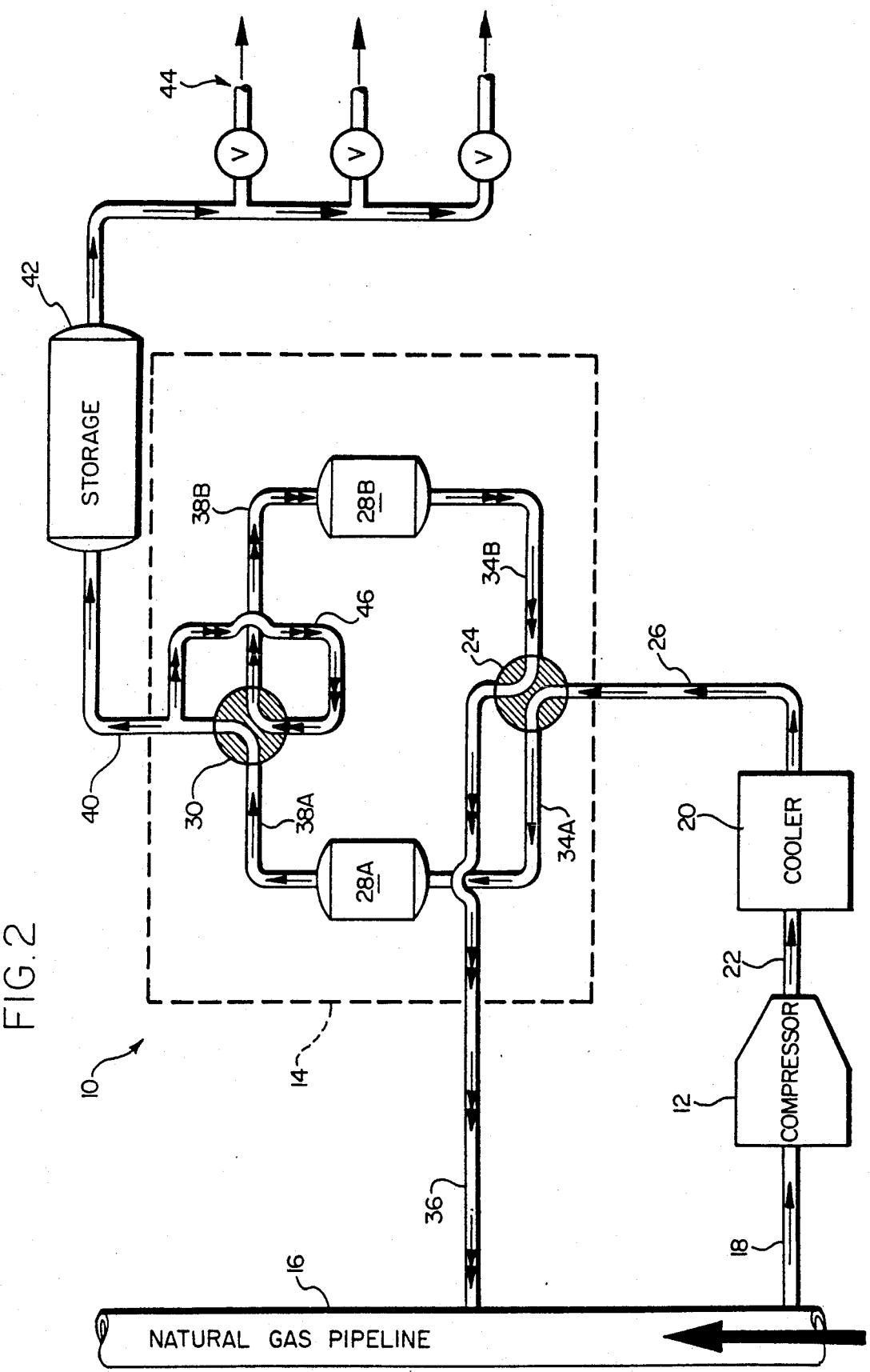

COMPRESSED NATURAL GAS DRYER SYSTEM AND METHOD OF OPERATION

BACKGROUND OF THE INVENTION

The present invention generally relates to a system for compressing and drying gases and a method of operation of such a system. The invention more specifically relates to a system and method for compressing and drying natural gas.

The federal government, as well as many state governments, have passed laws mandating introduction of "cleaner" (i.e. more complete burning, and thus less incomplete combustion byproduct producing) engines for motor vehicles. One aspect of these laws calls for the utilization of cleaner burning fuels for motor vehicles. One such fuel is natural gas, which burns much more cleanly than gasoline or diesel fuel. Accordingly, automobile manufacturers are researching the feasibility of manufacturing and marketing automobiles and other motor vehicles powered by natural gas burning engines.

It has been determined that to make natural gas burning engines a viable alternative for motor vehicles, the natural gas would have to be stored on the vehicle in an on-board tank at a pressure within the range of three thousand to five thousand psi. Because the compressed natural gas (hereinafter "CNG") must be stored at such high pressures, maintaining the structural integrity of the on-board tank is very important for insuring the safety of the vehicle's users.

If the CNG includes an amount of water, in vapor form of otherwise, it is possible for acids to form within the tank. These acids can corrode the tank, eventually causing it to leak and to rupture, thereby compromising the safety of the vehicle's users. Additionally, harmful hydrates or water ice crystals could form in the tank, the engine, or the fuel delivery system between the tank and the engine. These compounds could form blockages or could otherwise damage the engine. Therefore, the CNG must be dried before it is delivered into and stored in the on-board tank.

Methods of and systems for drying gases, such as CNG are well known to those having ordinary skill in the relevant art. One such system is illustrated in FIG. 1, utilizing a so-called heatless regenerative gas dryer 35 located in a path of CNG flow downstream from a compressor 33 which increases the pressure of the gas from a supply line pressure to the requisite three to five thousand psi. The dryer generally comprises a pair of drying towers 32A, 32B so that, at any given moment, one tower is drying CNG while the other is being regenerated to remove water adsorbed from the CNG during a previous drying cycle.

To regenerate a given tower, a portion of dry CNG exiting the other tower is directed through the first tower, preferably in a direction opposite to the direction of gas flow during the drying cycle, at a reduced pressure. This reduced pressure dry CNG flow absorbs the water previously collected by the tower, thereby regenerating the tower. Therefore, the regenerating or purge gas exiting the regenerating tower is "wet" in that it includes the water previously collected by the tower.

According to the teachings of the prior art, in an effort to prevent gas loss from the system, the wet purge gas is fed back into an intake of the compressor where it is mixed with new gas from a gas supply line. Resultant gas, generated by the above-noted mixing, is substantially wetter than the gas normally delivered to the compressor from the supply line. The increased water content of the resultant gas fed to the compressor causes the compressed gas exiting the compressor to be saturated with water. This saturation requires the addition of a moisture separator 27 including a drain 29 to be located in the gas flow path between an post-compressor cooler and the dryer, as shown in FIG. 1, to remove excess water from the CNG. Thus, the system as a whole, presents numerous disadvantages, which can make this drying system and method unattractive to some users.

Specifically, the compressor must work harder to compress the resultant gas because the energy required to compress the gas increases in relation to the water included in the gas. The requisite moisture separator and drain add additional costs to the system. Furthermore, because of the increased water content of the gas, the size and the cost of the dryer towers must be correspondingly increased. Additionally, the amount of purge gas required to regenerate the towers is also correspondingly increased, thereby decreasing the efficiency of the system. That is, the water contained in the gas is constantly recycled through the system by mixture of the purge gas with the supply line gas.

The present invention presents a novel system and method for compressing and drying gases which is intended to solve some of the problems associated with the relevant systems and methods of the prior art. It is hoped that, with the utilization of the system and method of the invention, cleaner, natural gas burning engines will become a viable alternative to gasoline and diesel engines.

OBJECTS AND SUMMARY OF THE INVENTION

A general object of the present invention is to provide a novel system for compressing and drying gases.

A more specific object of the invention is to provide a novel method of drying compressed gases.

Another object of the present invention is to provide a novel compressed gas dryer system having particular utility with drying compressed natural gas.

An additional object of the invention is to provide a heatless regenerative CNG dryer system.

A further object of the present invention is to provide a CNG dryer system which does not recycle or concentrate water therein.

Yet another object of the invention is to provide a CNG dryer system which can employ a smaller, less expensive, more reliable and efficient dryer than dryers required to be employed in systems of the prior art.

An additional object of the present invention is to provide a CNG dryer system which requires a dryer to remove less water from the CNG as compared with the systems of the prior art.

A further object of the invention is to provide a CNG dryer system which does not require a post-compressor water separator or drain.

Another object of the present invention is to provide a CNG dryer system which requires less purge gas as compared to systems of the prior art.

A compressed gas dryer system, constructed according to the teachings of the present invention, comprises a gas source for supplying the system with gas, and a compressor operatively connected to the source for compressing the gas. A regenerative dryer for collecting water from the gas is operatively connected to the compressor such that the compressor is within a path of gas flow between the source and the dryer. The dryer is also operatively connected to the source such that water collected from the gas and removed from the dryer does not enter the compressor. A method of compressing and drying a gas is also provided comprising the steps of: supplying a compressor with gas from a source; compressing the gas; collecting water from the gas with a regenerative dryer; regenerating the dryer by removing collected water from said dryer with a purge gas; and delivering the purge gas to the source such that purge gas or collected water is not supplied to the compressor.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following description taken in connection with the accompanying drawings in which like reference numerals identify like elements, and in which:

FIG. 2 is a system schematic diagram of a CNG dryer system, constructed according to the teachings of the present invention.

DETAILED DESCRIPTION OF THE ILLUSTRATED EMBODIMENT

Figure 1:
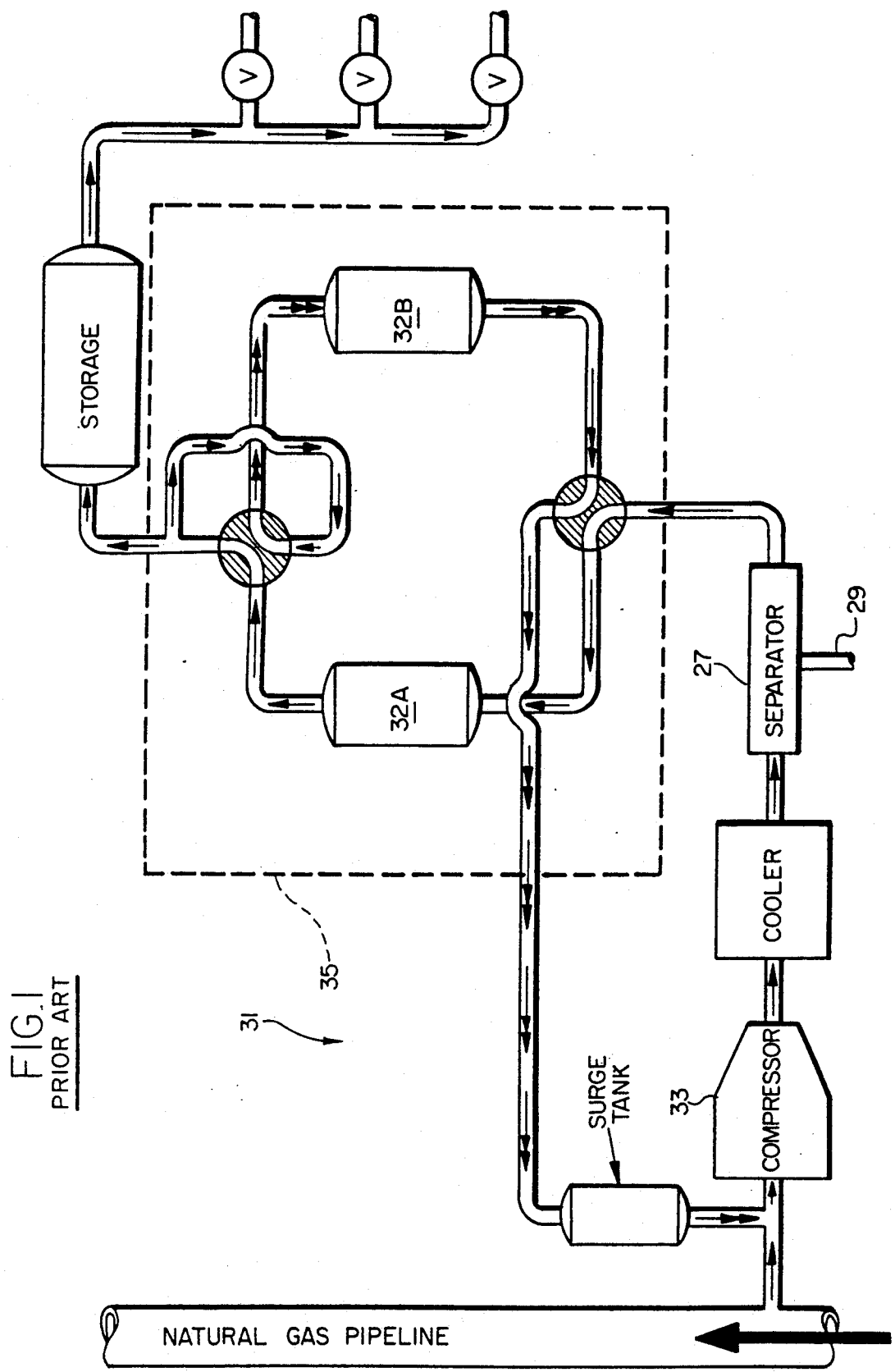
FIG. 1 is a system schematic diagram of a CNG dryer system of the prior art.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

Referring to FIG. 2, a system 10, constructed according to the teachings of the present invention, for compressing and drying natural gas is illustrated in system schematic form. While the system 10 and a method of operation thereof will be discussed in detail with respect to their employment with natural gas, it is to be clearly understood that the system 10 and method of the present invention can be effectively employed with other gases as well, without departing from the intended scope of the invention.

As shown in FIG. 2, the system 10 generally comprises a compressor 12 and a regenerative, heatless gas dryer 14, both of known construction. The construction and operation of the gas dryer 14 is discussed in U.S. Pat. No. 4,971,610 to Henderson. The disclosure of that patent is incorporated herein by reference. The dryer 14 is connected to and located downstream from the compressor 12. The compressor 12 is connected to a natural gas supply pipeline 16, such as that provided by a local natural gas utility, by an appropriate piece of pipe or conduit 18. The compressor 12 is therefore supplied with natural gas at line pressure, which is usually substantially less than the required three to five thousand psi discussed hereinabove. Also, it is to be noted that while the natural gas present in the pipeline 16, and thus the conduit 18, is substantially dry, this gas is not sufficiently dry for the purposes described hereinabove.

The compressor 12 accepts the gas from the conduit 18 and compresses it, by known means, to the desired, requisite pressure of three to five thousand psi. As the gas is compressed, the thermal energy embodied therein increases, thereby raising the temperature of the compressed gas. This phenomenon is well known to those skilled in the relevant art. Accordingly, to reduce the temperature of the CNG, a gas cooler 20, of known construction, is connected to the compressor 12 by a suitable conduit 22 so that hot CNG can pass from the compressor 12 through the conduit 22 into the cooler 20.

The cooler 20 reduces the temperature of the CNG by known means to an appropriate level for drying by the dryer 14. An end of the cooler 20 opposite to the end thereof connected to the conduit 22 is connected to a first four-way valve 24, preferably located within the dryer 14, by an appropriate conduit 26. The operation of the valve 24 will become more clear hereinafter. It is to be noted that the system 10 does not require an aftercooler separator 27 and a drain 29, as shown in the prior art system 31 of FIG. 1, located within the path of CNG flow between the cooler 20 and the dryer 14. This is an improvement over the gas drying systems and methods of the prior art.

The gas dryer 14 generally comprises the first four-way valve 24, at least a pair of drying elements or towers 28A and 28B, and a second four-way valve 30. The towers 28A and 28B are of known construction and adsorb water from the CNG as the CNG passes therethrough during the drying cycle. Preferably, two towers 28A and 28B are provided so that, at any given moment, one tower 28A, for example, can dry CNG, while the other tower 28B, for example, can be regenerated. This increases the efficiency of the system 10. It is to be noted that the towers 28A and 28B can be smaller than towers 32A and 32B of the system 31 illustrated in FIG. 1. This is due to the fact that the towers 28A and 28B do not have to remove as much water as the towers 32A and 32B because water and gas are not recycled within the system 10 as they are in the system 31.

Drawing attention once again to FIG. 2, the towers 28A and 28B are connected to the first four-way valve 24 by suitable conduits 34A and 34B, respectively. The first valve 24 is also connected by a conduit 36 to the pipeline 16 at a location downstream in a path of gas flow from a location where the conduit 18 is connected to the pipeline 16. This location of the conduit 36 insures that no purge gas will enter the conduit 18 or be fed to the compressor 12.

The first valve 24 is constructed for selectively directing CNG from the cooler 20 into one of the towers 28A and 28B. Also, the valve 24 can simultaneously selectively direct purge gas from the other one of the towers 28A and 28B into the conduit 36 and thus into the pipeline 16. While FIG. 2 illustrates tower 28A in the drying cycle and tower 28B in the regenerating cycle, it is to be clearly understood that these cycles can be reversed as desired by appropriate manipulation of the valves 24 and 30. By directing the purge gas into the pipeline 16, water is not recycled in the system 10, thereby making the system 10 an improvement over the gas drying systems of the prior art.

Ends of the towers 28A and 28B opposite to the ends thereof connected to the conduits 34A and 34B are connected to the second four-way valve 30, substantially similar in construction to the valve 24, by suitable conduits 38A and 38B, respectively. The valve 30 is preferably also connected by an appropriate conduit 40 to a storage tank 42 for storing dry CNG. The storage tank 42 is an optional feature which may be eliminated in appropriate circumstances. The storage tank 42 is, in turn, connected to dry CNG distribution means, indicated generally by reference character 44. The means 44 is of suitable construction for filling dry CNG receptacles, such as the vehicle on-board storage tanks discussed hereinabove.

A branch conduit 46 is connected to the conduit 40 between the valve 30 and the tank 42, with an opposite end of the branch conduit 46 being connected to the valve 30. The branch conduit 46 allows a portion of the dry CNG in the conduit 40 to be routed back to the valve 30, and from there to the towers 28A and 28B, for use as purge gas for regenerating the towers 28A and 28B. Accordingly, the conduit 46 cooperates with the valve 30 to form means for regenerating the towers 28A and 28B. The purge gas flows to the valve 30, which selectively directs it to one of the towers 28A or 28B for regenerating that tower, as described above. The valve 30 also serves to reduce the pressure of the purge gas by known means. By reducing the pressure of the purge gas, its volume increases. Thus, the purge gas becomes even drier, thereby increasing its ability to absorb collected water from the towers 28A and 28B. Therefore, a relatively small amount of purge gas is needed to regenerate the towers 28A and 28B, thereby increasing the efficiency of the system 10.

However, it is to be noted that the reduced pressure of the purge gas is still greater than the pressure of the natural gas in the pipeline 16. In this manner, purge gas flow from the valve 30, through one of the towers 28A and 28B, the valve 24 and the conduit 36 to the pipeline 16 is facilitated. As the purge gas flows through one of the towers 28A and 28B, it absorbs the collected water. The water-bearing purge gas is then discharged back into the pipeline 16 where it is mixed with natural gas therein. The volume of gas in the pipeline 16 dilutes the purge gas, thereby making the added water content supplied by the purge gas relatively insignificant. In this manner, water is not recycled in the system 10, as distinguished from the system 31 of FIG. 1.

With the construction and operation of the system 10 being thusly disclosed, a method of operating the system 10, or more properly, a method for compressing and drying gases will now be discussed in detail. Again, as indicated hereinabove, this method can be effectively utilized with a plurality of gases.

To manufacture dry CNG, natural gas is supplied from a suitable source through a pipeline 16 at a predetermined line pressure. The natural gas is then compressed by the compressor 12 to a pressure of three to five thousand psi, thereby producing CNG. This pressurization raises the temperature of the CNG. The CNG is then preferably cooled to a suitable temperature for drying.

Once cooled, the CNG is directed into a regenerative heatless gas dryer, preferably comprising at least two drying elements or towers 28A and 28B. The CNG flows into one of the drying elements 28A or 28B, which adsorbs water from the CNG. The CNG is now dry and ready for storage and/or distribution. A portion of the dry CNG, however, is diverted from storage and/or distribution to be used as purge gas for regenerating one of the drying elements 28A or 28B.

The pressure of the dry purge gas is reduced somewhat by valve means, thereby increasing water absorbing properties of the gas. The purge gas then flows through the element 28A or 28B to be regenerated, where the gas absorbs water collected from the CNG during a previous drying cycle. The water-bearing purge gas exits the element 28A or 28B and flows to the pipeline 16. The purge gas enters the pipeline 16 at a location downstream from a connection between the pipeline 16 and the compressor 12 so that no purge gas can enter the compressor 12.

The gas compressing and drying system 10 and method of the present invention provide substantial improvements over the systems and methods of the prior art. Water is not recycled in the system 10 or by the method of the invention. Thus, the dryer 14 needs to remove far less water as compared to the dryers of the prior art. Thus, the dryer 14 can be smaller, more reliable, more efficient and less expensive than the dryers required by the prior art systems and methods. The compressor 12 does not have to compress or pressurize relatively wet purge gas mixed with line-supplied gas, so the compressor 12 does not have to work as hard as the compressors of the prior art systems. This reduced wear and tear on the compressor 12 can result in great benefits to a system operator. Additionally, because purge gas is not fed to the compressor 12, an additional separator 27 and drain 29 are not needed, as required by the system 31 of FIG. 1. Also, because total water in the system 10 is reduced, as compared to the system 31, the amount of purge gas needed is correspondingly reduced, making the system 10 more efficient.

While a particular embodiment of the invention has been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The invention is claimed as follows:

1. A system for compressing and drying a gas from a gas source comprising: a conduit coupled to the gas source for supplying the system with gas; a compressor operatively connected to the conduit for compressing the gas; a dryer operatively connected to the compressor for collecting water from the gas; said dryer having a pair of regenerative drying towers; valve means operatively connected to the towers for permitting one of the towers to collect water from said gas while permitting the other of the towers to regenerate by removing collected water from said other of the towers, and for selectively reversing the two towers; and water removal means operatively connected to the dryer for removing collected water from said dryer and operatively connected to said gas source for delivering the water removed from said dryer to said gas source; said water removal means comprising a first conduit and a second conduit; the first conduit being connected between the one tower and the valve means for supplying said valve means with a dried purge gas for removing collected water from the other tower; the valve means being operatively connected to the other tower for selectively supplying said other tower with said purge gas and for receiving purge gas bearing collected water therefrom; and the second conduit being operatively connected between said valve means and the gas source for delivering said purge gas bearing collected water to said source such that collected water is prevented from entering the compressor.

2. A system as defined in claim 1 further comprising a cooler operatively connected between the compressor and the dryer for cooling said gas before said gas enters the dryer.

3. A system as defined in claim 1 further comprising valve means operatively connected to the source, the dryer and the water removal means for regulating gas flow from the compressor to the dryer and from the dryer to the gas source.

4. A system as defined in claim 1 wherein the gas source comprises a gas utility supply pipeline.

5. A method of compressing and drying a gas comprising the steps of: supplying a compressor with gas from a source; compressing the gas; collecting water from the gas with a regenerative dryer; regenerating the dryer by removing collected water from said dryer; and delivering the collected water to the source such that no collected water is supplied to the compressor.

6. A method according to claim 5 further comprising the step of cooling the gas after said gas is compressed.

7. A method according to claim 5 further comprising the steps of removing collected water from said dryer by directing an absorbing purge gas into said dryer; and delivering said purge gas along with the collected water to the source such that no purge gas or collected water is supplied to the compressor.

8. A method according to claim 7 further comprising the step of reducing purge gas pressure before directing said purge gas into the dryer.

9. A system for compressing and drying a gas from a gas source comprising: a conduit coupled to the gas source for supplying the system with gas; a compressor operatively connected to the source for compressing said gas; a regenerative dryer for collecting water from said gas operatively connected to the compressor such that the compressor is within a path of gas flow between the source and the dryer; and water removal means operatively connected to the dryer and to the source for delivering water collected from said gas and removed from the dryer to said gas source such that said water collected from said gas and removed from said dryer cannot enter the compressor.

10. A system as defined in claim 9 wherein the dryer comprises an outlet, a first valve and a second valve, a pair of regenerative drying towers, and conduit means connected between the first valve and the second valve so that gas can flow from the compressor through said second valve, into one of the towers, and through said first valve to the outlet, and so that purge gas can flow from the outlet through the other of said towers, thereby regenerating said other of said towers.

11. A system as defined in claim 10 wherein the water removal means comprises a conduit connected between the second valve and the source for delivering said purge gas and collected water removed from the other tower to said source such that said purge gas and said collected water removed from the other tower cannot enter the compressor.

12. A system as defined in claim 11 wherein the first and second valves are operatively connected to the compressor and to the towers for selectively reversing the towers such that when one tower is collecting water from said gas while one tower is regenerating.

13. A system as defined in claim 9 further comprising cooler means operatively located between the compressor and the dryer for cooling gas before said gas enters the dryer.

14. A system as defined in claim 9 further comprising distributing means operatively connected to the dryer for distributing dry compressed gas produced by the system.

15. A system as defined in claim 9 wherein the source comprises a gas utility gas main.

16. A system as defined in claim 15 wherein the compressor is operatively connected to the gas main at a first location and the water removal means is operatively connected to the gas main at a second location; and the first location being disposed on the gas main upstream in a path of gas flow through the gas main from the second location.

* * * * *